United States Patent

Wada et al.

[11] Patent Number: 6,016,843
[45] Date of Patent: Jan. 25, 2000

[54] FLANGED PIPE UNIT AND METHOD OF PRODUCING SAME

[75] Inventors: Kenichi Wada, Meiwa; Susumu Sato, Yabutsukahonmachi, both of Japan

[73] Assignee: Calsonic Corporation, Tokyo, Japan

[21] Appl. No.: 08/803,877

[22] Filed: Feb. 21, 1997

[30] Foreign Application Priority Data

Feb. 21, 1996 [JP] Japan .................................. 8-034052

[51] Int. Cl.⁷ ...................................................... F16L 9/02
[52] U.S. Cl. ........................... 138/109; 138/177; 138/178; 285/368; 285/412
[58] Field of Search ................................ 138/109, 177, 138/178, DIG. 11; 285/368, 412

[56] References Cited

U.S. PATENT DOCUMENTS

| | | | |
|---|---|---|---|
| 233,634 | 10/1880 | Morse | 138/177 |
| 786,847 | 4/1905 | Seery | 138/109 |
| 858,100 | 6/1907 | Pedersen | 138/109 |
| 1,824,499 | 9/1931 | Reichenbecher | 138/109 |
| 3,205,535 | 9/1965 | Niessner et al. | 138/109 |
| 3,362,435 | 1/1968 | Meyer | 138/178 |
| 3,368,588 | 2/1968 | Meyer | 138/178 |
| 4,130,932 | 12/1978 | Epmeier | |
| 4,193,426 | 3/1980 | Irmer | 138/109 |
| 4,214,781 | 7/1980 | Joseph | |
| 4,450,618 | 5/1984 | Ridenour | |
| 4,458,924 | 7/1984 | Schlicht | 285/412 |
| 4,691,740 | 9/1987 | Svetlik et al. | 138/109 |
| 5,810,054 | 9/1998 | Goulet et al. | 138/177 |

FOREIGN PATENT DOCUMENTS

| | | |
|---|---|---|
| 381407 | 1/1908 | France . |
| 641507 | 8/1928 | France . |
| 4112431 | 10/1992 | Germany . |

*Primary Examiner*—Andres Kashnikow
*Assistant Examiner*—James F. Hook

[57] ABSTRACT

To produce a flanged pipe unit, a separate flange is put on a pipe and then the pipe is subjected to a punching to achieve an interlocked connection between the flange and the pipe. The flanged pipe unit produced by the method of the invention comprises a metal pipe including a larger expanded portion, a smaller expanded portion and a raised portion which are axially aligned so that the smaller expanded portion is placed between the larger expanded portion and the raised portion; and a metal flange having a through bore through which the pipe passes, the through bore including a larger diameter portion, a smaller diameter portion and a tapered end portion which are axially aligned so that the smaller diameter portion is placed between the larger diameter portion and the tapered end portion. The larger expanded portion, the smaller expanded portion and the raised portion of the pipe are intimately engaged with the larger diameter portion, the smaller diameter portion and the tapered end portion of the through bore respectively thereby to establish a dove-tail coupling between the pipe and the flange.

6 Claims, 3 Drawing Sheets

FLANGED PIPE UNIT AND METHOD OF PRODUCING SAME

BACKGROUND OF THE INVENTION

1. Field of the Invention

The present invention relates in general to a pipe having a flange mounted thereon, and more particularly to a flanged pipe unit which is connected to a certain device by using the flange mounted thereon. More specifically, the present invention is concerned with a flanged pipe unit which is widely used for piping the cooling system of an automotive air conditioner.

2. Description of the Prior Art

In the cooling system of an automotive air conditioner, many devices are connected through pipes in which a refrigerant flows. For connecting the pipes to the devices, various measures have been proposed and put into practical use.

One of them is shown schematically in FIG. 3 of the accompanying drawings. In this measure, a flanged pipe unit 50 is used. That is, a flange 1 tightly disposed on a pipe 5 is used for connecting the pipe 5 to a device 7. That is, a leading pipe portion projected from the unit 5 is put into a bore 8 of the device 7, and then the flange 1 on the pipe 5 is secured to the device 7 by means of bolts (not shown). Denoted by numerals 6 and 9 are aligned bolt holes formed in the flange 1 and the device, with which one bolt is incorporated. Although not shown in the drawing, the blind hole 9 has a threaded inner wall with which a threaded leading end of the bolt is engaged.

The tight mounting of the flange 1 on the pipe 5 is carried out by using the following technique.

First, a flange 1 is prepared, which has a through bore 2 including a larger diameter portion 3 and a smaller diameter portion 4 between which a slanted intermediate portion 1c is defined. Then, a pipe 5 is prepared, which has therethroughout an outer diameter slightly smaller than the diameter of the smaller diameter portion 4 of the flange 1. Then, the pipe 5 is inserted into the through bore 2 of the flange 1 having a leading end portion thereof projected from an inner surface 1a of the flange 1. The inner surface 1a is the surface at which the larger diameter portion 3 of the through bore 2 terminates. Then, with the pipe 5 and the flange 1 kept held by a holding tool (not shown), the projected leading end portion of the pipe 5 is punched by a punch 51. With this, the leading end portion of the pipe 5 is radially outwardly expanded in such a manner that a deeper part of the expanded portion is intimately engaged with the inner surfaces of the larger diameter and slanted intermediate portions 3 and 1c of the bore 2, as shown in the drawing. With this, a so-called interlocked connection is achieved between the flange 1 and the pipe 5. After this, the flange 1 is bolted to the device 7 in the above-mentioned manner to effect a hermetically sealed connection between the pipe 5 and the device 7.

However, the above-mentioned technique for the interlocked connection has the following drawbacks.

That is, as is seen in FIG. 3, a certain clearance "C" is inevitably produced between the smaller diameter portion 4 of the bore 2 of the flange 1 and the outer surface of the pipe 5. Such clearance "C" tends to collect water, dust and the like, which causes corrosion of the pipe 5. When the flange 1 is of a cast member, the clearance "C" is much marked because of usage of a two-piece type casting die for casting the flange 1. In fact, each half of this die has a certain draft which causes the smaller diameter portion 4 (also the larger diameter portion 3) to have a tapered inner surface, thereby increasing the size of the clearance "C". Furthermore, the clearance "C" tends to permit vibration of the pipe 5 relative to the fixed flange 1 particularly when the cooling system is in operation. Of course, such vibration is undesired in view of fatigue of the pipe 5 and possibility of cancellation of the interlocked connection between the flange 1 and the pipe 5. Although the clearance "C" may be filled with a packing material, such work increases the cost of the cooling system.

SUMMARY OF THE INVENTION

It is therefore an object of the present invention to provide a flanged pipe unit which is free of the above-mentioned drawbacks.

It is another object of the present invention to provide a method of producing the flanged pipe unit.

It is still another object of the present invention to provide a device for producing the flanged pipe unit.

According to a first aspect of the present invention, there is provided a flanged pipe unit which comprises a metal pipe including a larger expanded portion, a smaller expanded portion and a raised portion which are axially aligned so that the smaller expanded portion is placed between the larger expanded portion and the raised portion; and a metal flange having a through bore through which the pipe passes, the through bore including a larger diameter portion, a smaller diameter portion and a tapered end portion which are axially aligned so that the smaller diameter portion is placed between the larger diameter portion and the tapered end portion, wherein the larger expanded portion, the smaller expanded portion and the raised portion of the pipe are intimately engaged with the larger diameter portion, the smaller diameter portion and the tapered end portion of the through bore respectively thereby to establish a dove-tail coupling between the pipe and the flange.

According to a second aspect of the present invention, there is provided a method of producing a flanged pipe unit, which comprises the steps of (a) preparing a pipe and a flange, the flange having a through bore through which the pipe can pass, the through bore including larger and smaller diameter portions; (b) positioning the pipe with the flange put thereon, the pipe having a given portion projected from the flange; (c) inserting a punching rod into the given portion of the pipe to radially expand the same to produce a larger expanded portion which intimately engages with the inner surface of the larger diameter portion of the flange; and (d) moving the punching rod and the flange together to axially compress a certain part of the pipe thereby to produce a raised portion of the pipe which intimately contacts with an outer end of the inner surface of the smaller diameter portion of the flange.

According to a third aspect of the present invention, there is provided a device for producing a flanged pipe unit which comprises a clamping tool including holding blocks by which a pipe is held, a plurality of supporting pins slidably received in respective holes formed in the holding blocks, springs for biasing the supporting pins in one direction thereby to project the pins from the holding blocks by a given degree, and a detachable stopper 21 positioned away from the holding blocks; and a punching tool including a punching rod having a spherical head portion, a flange holder slidably disposed on the punching rod and a spring compressed between a base of the punching rod and the flange holder.

BRIEF DESCRIPTION OF THE DRAWINGS

Other objects and advantages of the present invention will become apparent from the following description when taken in conjunction with the accompanying drawings, in which.

DETAILED DESCRIPTION OF THE INVENTION

Figure 1:
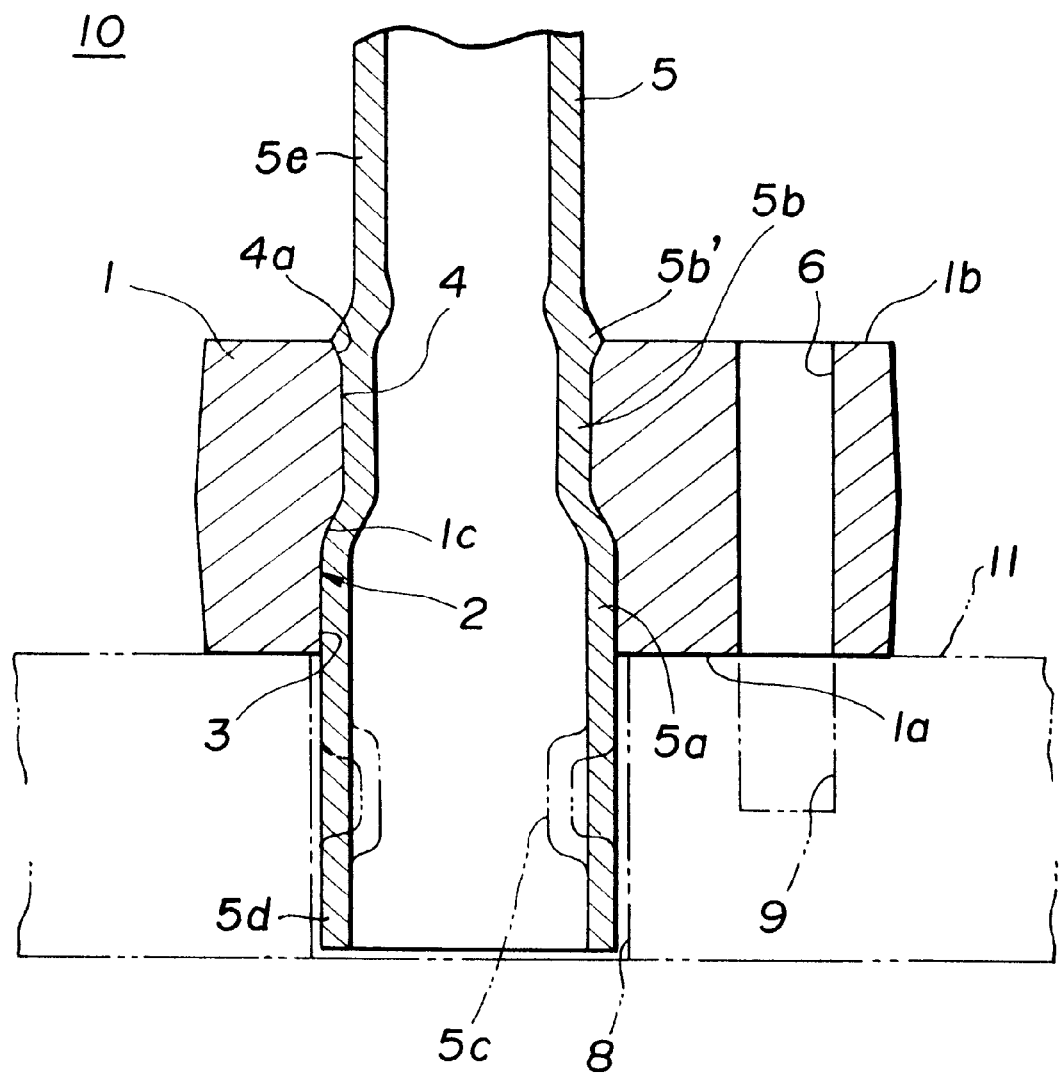
FIG. 1 is a sectional view of a flanged pipe unit of the present invention with a device (illustrated by a phantom line) to which a pipe of the unit is connected.

Referring to FIG. 1, a flanged pipe unit 10 of the present invention is shown with a lid member 11 of a liquid tank to which the unit 10 is connected. The liquid tank is used in a cooling system of an automotive air conditioner.

The flanged pipe unit 10 comprises a metal pipe 5 and a metal flange 1 which are coupled tightly by using a unique coupling technique which will be described hereinafter. Preferably, the pipe 5 and the flange 1 are constructed of aluminum.

The flange 1 is formed with a through bore 2 including a larger diameter portion 3 and a smaller diameter portion 4 between which a slanted intermediate portion 1c is defined. As shown, the through bore 2 has a tapered end portion 4a at which the smaller diameter portion 4 terminates. That is, the tapered end portion 4a is exposed to an outer surface 1b of the flange 1.

The pipe 5 is formed with a larger expanded portion 5a, a smaller expanded portion 5b and a raised portion 5b' which are intimately engaged with the inner surfaces of the larger diameter, smaller diameter and tapered end portions 3, 4 and 4a of the flange 1, respectively. The pipe also has a first part 5d extending axially outward in one direction from the larger expanded portion of the metal pipe, and a second part 5e extending axially outward in an other direction from the raised portion of the metal pipe. Thus, a completely interlocked connection is achieved between the pipe 5 and the flange 1.

Figure 3:
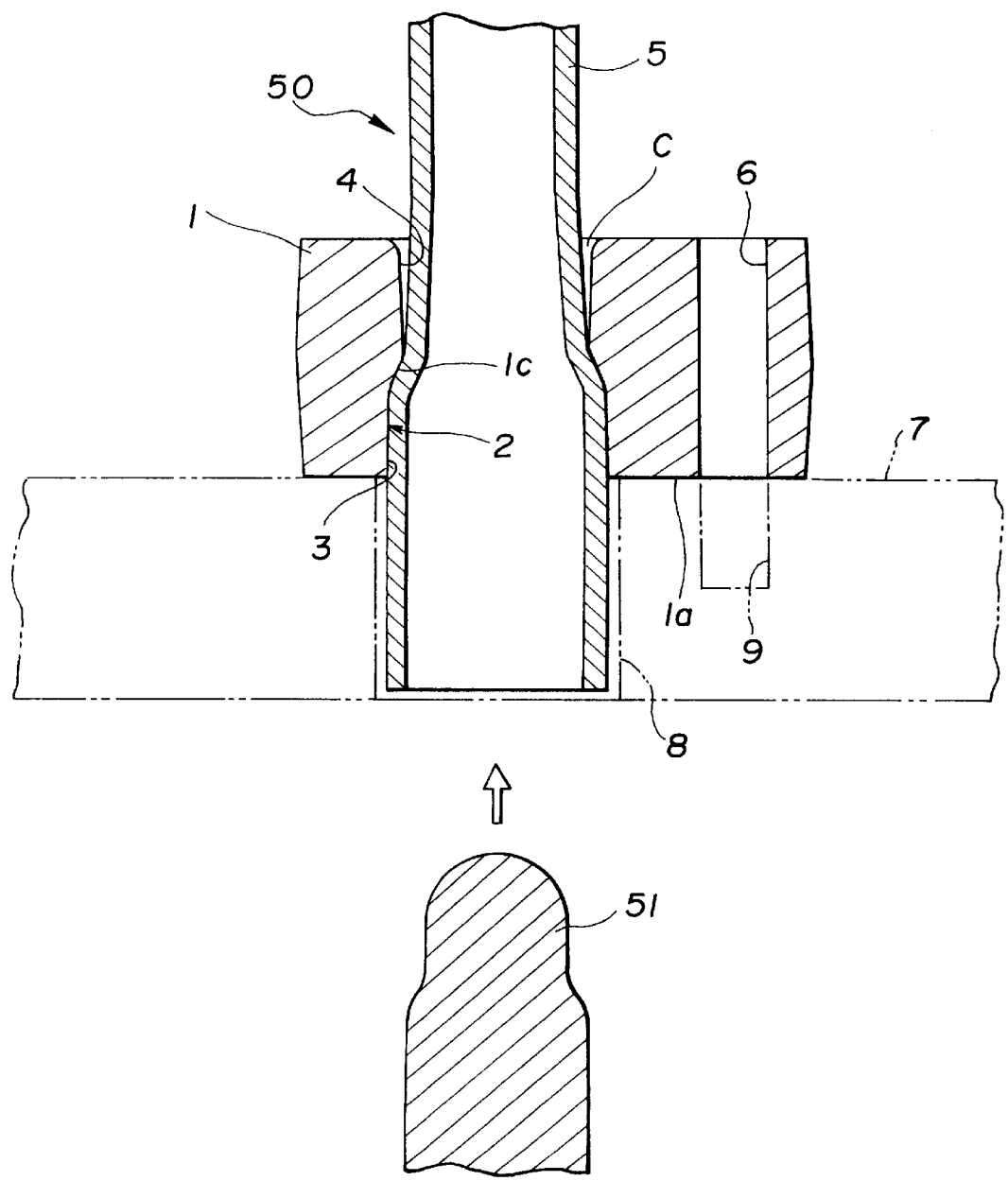
FIG. 3 is a view similar to FIG. 1, but showing a conventional flanged pipe unit.

The flanged pipe unit 10 having the above-mentioned construction is connected to the lid member 11 by bolts in the same manner as in the case of the above-mentioned conventional flanged pipe unit 50 of FIG. 3. That is, after the projected pipe portion of the unit 10 is put into a bore 8 of the lid member 11, the flange 1 on the pipe 5 is secured to the lid member 11 by the bolts. Aligned bolt holes 6 and 9 formed in the flange 1 and the lid member 11 respectively accommodate one bolt. The blind hole 9 has a threaded inner wall for tightly engaging with a threaded leading end of the bolt. An annular groove 5c is formed around the projected leading portion of the pipe 5. That is, with an O-ring (not shown) put in the groove 5c, a hermetic sealing is achieved between the pipe 5 and the lid member 11. It is to be noted that such hermetic sealing is also achieved when a seal member (not shown) is intimately put between the flange 1 and the lid member 11.

In the following, a method for producing the flanged pipe unit 10 of the invention will be described with reference to FIGS. 2(A), 2(B), 2(C) and 2(D).

Before describing production steps of the method, tools used for carrying out the method will be described with reference to FIG. 2(A). That is, for practicing the method, a clamping tool "X" and a punching tool "Y" are used.

As is seen from the drawing, the clamping tool "X" comprises a pair of holding blocks 22 each having a semi-cylindrical groove. Due to a force of biasing means (not shown), the two holding blocks 22 are biased toward each other mating the respective grooves. Each block 22 is provided with a plurality of (for example, three or four) supporting pins 23 slidably received in respective holes formed in the block 22. Each pin 23 is biased leftward in the drawing by a spring 23a. In a rest condition, each pin 23 is projected from the block 22 by a given degree, as shown. If desired, in place of the springs 23a, pressurized air may be used for biasing the supporting pins 23. The clamping tool "X" further comprises a detachable stopper 21 which is positioned away from the paired blocks 22, as shown. One surface of the paired blocks 22 which faces toward the stopper 21 is denoted by numeral 22a.

Figure 2:
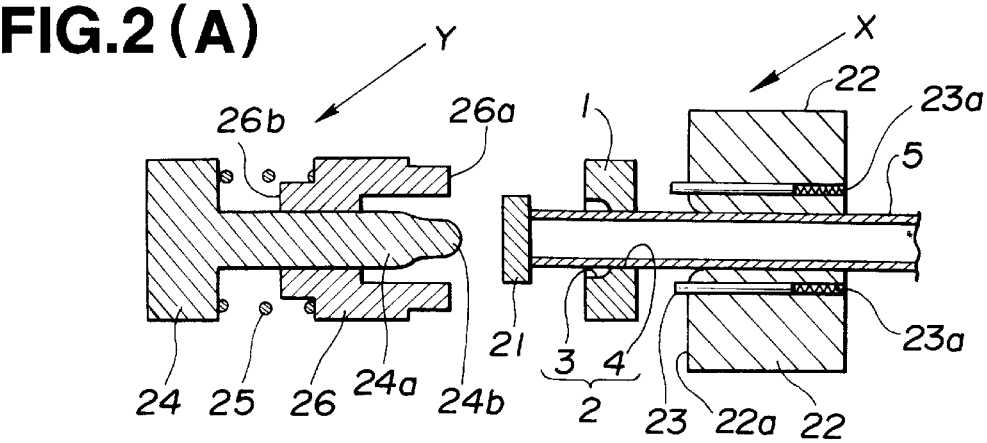
FIGS. 2(A), 2(B), 2(C) and 2(D) are views showing steps for producing the flanged pipe unit of the present invention.
Figure 2:
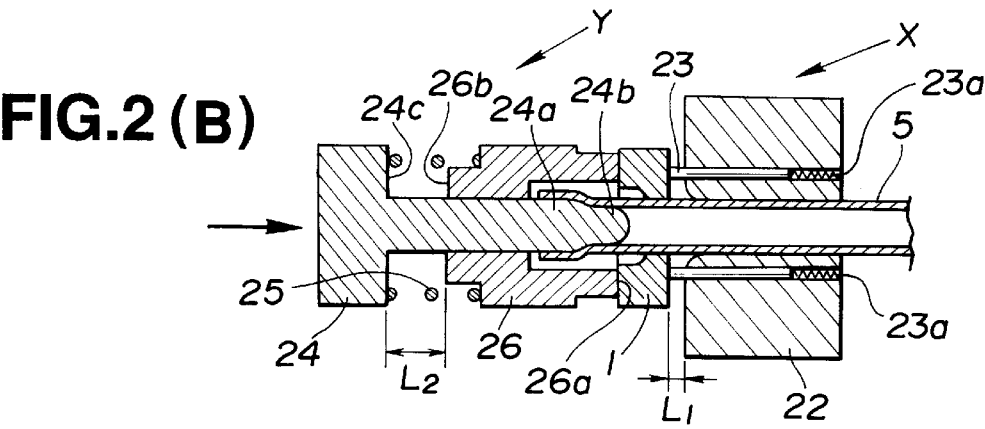
Figure 2:
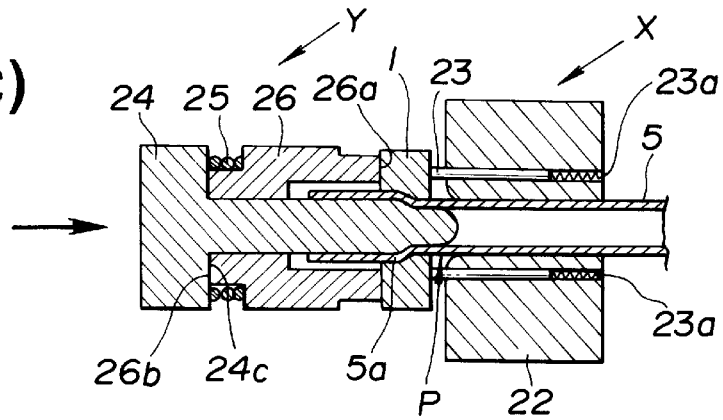
Figure 2:
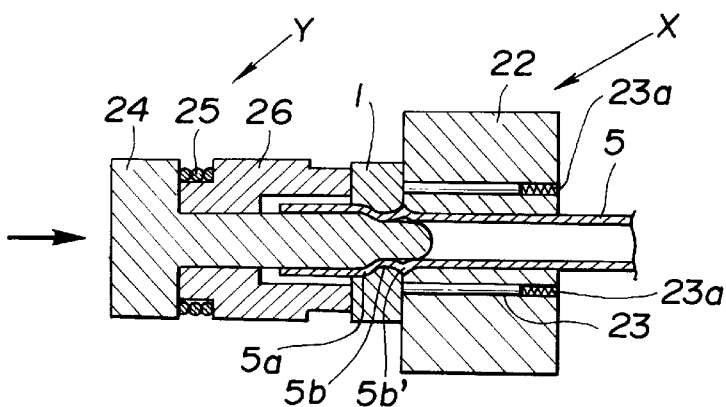

As is seen from FIG. 2(A), the punching tool "Y" comprises a punching rod 24 which includes a cylindrical major portion 24a and a spherical head portion 24b. Axially slidably disposed on the cylindrical major portion 24a is a flange holder 26 which has one face 26a directed toward the clamping tool "X" and the other face 26b directed toward a base of the punching rod 24. Compressed between the base of the punching rod 24 and the flange holder 26 is a spring 25 by which the flange holder 26 is biased rightward in the drawing. For the reasons which will become apparent hereinafter, the biasing force produced by the spring 25 is quite small as compared with the biasing force produced by all of the springs 23a of the clamping tool "X".

Steps for producing the flanged pipe unit 10 of the invention are as follows.

First, as is shown in FIG. 2(A), a pipe 5 having a separate flange 1 slidably put thereon is set in the clamping tool "X" in such a manner that a leading end of the pipe 5 abuts against the stopper 21. That is, the pipe 5 is tightly sandwiched by the paired holding blocks 22.

It is now to be noted that the flange 1, in this untreated condition, has substantially the same construction as the flange 1 of FIG. 1 except for the tapered end portion 4a. That is, the untreated flange 1 has no portion corresponding to the tapered end portion 4a. More specifically, in the untreated flange 1, the inner surface of the smaller diameter portion 4 extends straight to the outer surface of the flange 1. Of course, the diameter of the smaller diameter portion 4 of the flange 1 is slightly larger than the outer diameter of the pipe 5 thereby to permit sliding of the flange 1 on the pipe 5. Under this condition, there is no need to position the flange 1 relative to the positioned pipe 5.

Then, as is seen from FIG. 2(B), after the stopper 21 is removed, the punching tool "Y" is moved rightward, that is, toward the clamping tool "X" by pushing the punching rod 24 in the direction of the arrow. During this movement, the spherical head portion 24b of the punching rod 24 is inserted into the leading end of the pipe 5, and the flange holder 26 on the punching rod 24 is moved in the same direction and brought into contact with the flange 1 at the face 26a. Further rightward movement of the punching rod 24 advances the insertion of the head portion 24b into the pipe 5 and causes the flange holder 26 to press the flange 1 against the leftward biased supporting pins 23 of the clamping tool "X" as is shown in the drawing. Until the time when the flange 1 comes into contact with the supporting pins 23, the distance between the face 26b of the flange holder 26 and the base 24c of the punching rod 24 is kept "$L_2$" and the length of the projected portion of each pin 23 is kept "$L_1$".

When thereafter, as is seen from FIG. 2(C), the rightward movement of the punching rod 24 is further advanced, the spring 25 of the punching tool "Y" is compressed and finally induces a condition wherein the base 24c of the punching rod 24 abuts against the face 26b of the flange holder 26 failing to push the projected supporting pins 23 into the respective holes of the blocks 22. With this movement of the punching rod 24, the projected leading portion of the pipe 5 is expanded in such a manner that a deeper part of the expanded portion is intimately engaged with the inner surfaces of the larger diameter and slanted intermediate portions 3 and 1c of the bore 2, like in the case of the above-mentioned conventional flanged pipe unit 50. That is, upon completion of this step, a flanged pipe unit substantially the same as the conventional flanged pipe unit 50 of FIG. 3 is produced. Thus, the flange 1 and the pipe 5 are coupled, exhibiting an effective interlocked connection therebetween.

When then, as is seen from FIG. 2(D), the punching rod 24 is further pushed rightward, the entirety of the punching tool "Y" and the flange 1 are moved rightward together like a single unit pushing the projected supporting pins 23 into the respective holes of the blocks 22 against the big biasing force of the springs 23a.

During this, a limited portion "P" (see FIG. 2(C)) of the pipe 5 extending between the flange 1 and the face 22a of the blocks 22 is axially compressed to form the raised portion 5b'. Due to the expansion of the limited portion "P", the outside end of the smaller diameter portion 4 of the flange 1 is pressed to form the tapered end portion 4a (see FIG. 1). Thus, the expanded portion of the pipe 5 is intimately and entirely engaged with the inner surface of the stepped through bore 2 of the flange 1 as is seen from FIG. 1. That is, the expanded portion of the pipe 5 and the stepped through bore 2 of the flange 1 establishes a so-called dove-tail coupling therebetween. It has been revealed that the raised portion 5b' of the pipe 5 engages the tapered end portion 4a of the flange 1 with a smaller contacting force as compared with the contacting force with which the larger expanded portion 5a of the pipe 5 engages the larger diameter portion 3 of the flange 1.

If desired, the following modifications are usable in the steps for producing the flanged pipe unit 10.

That is, a position setter for positioning the flange 1 relative to the paired blocks 22 may be employed. In this case, the spring 25 is not needed and the flange holder 26 is secured to the punching rod 24.

Before setting the tube 5 in the clamping tool "X", the raised portion 5b' of the pipe 5 may be produced by using a suitable pressing machine. Thereafter, the pipe 5 is subjected to an expansion step keeping the raised portion 5b' in contact with the flange 1.

In the following, advantages of the present invention will be described.

In the flanged pipe unit 10 of the present invention, the expanded portion of the pipe 5 is intimately and entirely engaged with the inner surface of the through bore 2 of the flange 1. That is, the flanged pipe unit 10 of the invention has no clearance which corresponds to the clearance "C" inevitably produced in the above-mentioned conventional flanged pipe unit 50 of FIG. 3. Thus, any drawbacks due to such clearance are eliminated.

As is described hereinabove, the dove-tail tight coupling between the pipe 5 and the flange 1 is achieved by moving the punching rod 24 only in one direction. This means that the flanged pipe unit 10 of the invention can be easily and quickly produced, which is favorable for mass production.

Even when the flange 1 is of a cast member and thus the smaller diameter portion 4 thereof has a tapered inner surface, the step of expanding the limited portion "P" (see FIG. 2(C)) can allow the smaller expanded portion 5b of the pipe 5 to entirely and intimately engage with the tapered inner surface of the flange 1. That is, the dove-tail coupling is also established in such cast flange.

What is claimed is:

1. A flanged pipe unit comprising:

a metal pipe including:
   a larger expanded portion, a smaller expanded portion and a raised portion which are axially aligned so that said smaller expanded portion is located between said larger expanded portion and said raised portion;
   a first part extending axially outward in one direction from said larger expanded portion of said pipe; and
   a second part extending axially outward in an other direction from said raised portion of said pipe; and a metal flange having a through bore through which said pipe passes, said through bore including a larger diameter portion, a smaller diameter portion, and a tapered end portion which are axially aligned, with said smaller diameter portion located between said larger diameter portion and said tapered end portion, wherein said larger expanded portion, said smaller expanded portion, and said raised portion of the pipe are intimately engaged with said larger diameter portion, said smaller diameter portion, and said tapered end portion of the through bore, respectively, to establish a dove-tail coupling between said pipe and said flange, wherein the first part extends beyond one side of the flange and the second part extends beyond the other side of the flange, and wherein said larger and smaller expanded portions of said pipe are produced by radially expanding given portions of said pipe, and said raised portion is produced by axially compressing a given portion of said pipe.

2. A flanged pipe unit as claimed in claim 1, wherein said first part has an outer diameter equal to that of said larger expanded portion, and said second part has an outer diameter smaller than that of said smaller expanded portion.

3. A flanged pipe unit as claimed in claim 1, wherein said larger and smaller expanded portions of said pipe are integrally connected through a slanted portion, and said larger and smaller diameter portions of the through bore of said flange are connected through a slanted portion.

4. A flanged pipe unit as claimed in claim 1, wherein said pipe and said flange are constructed of aluminum.

5. A flanged pipe unit as claimed in claim 1, wherein said flange is formed with a plurality of bolt holes.

6. A flanged pipe unit comprising:

a metal pipe including:
   a larger expanded portion, a smaller expanded portion and a raised portion which are axially aligned so that said smaller expanded portion is located between said larger expanded portion and said raised portion;
   a first part extending axially outward in one direction from said larger expanded portion of said pipe; and
   a second part extending axially outward in an other direction from said raised portion of said pipe; and a metal flange having a through bore through which said pipe passes, said through bore including a larger diameter portion, a smaller diameter portion, and a tapered end portion which are axially aligned, with said smaller diameter portion located between said larger diameter portion and said tapered end portion, wherein said larger expanded portion, said smaller expanded portion, and said raised portion of the pipe are intimately engaged with said larger diameter portion, said smaller diameter portion, and said tapered end portion of the through bore, respectively, to establish a dove-tail coupling between said pipe and said flange, wherein the first part extends beyond one side of the flange and the second part extends beyond the other side of the flange, and wherein said larger and smaller expanded portions of said pipe are integrally connected through a slanted portion, and said larger and smaller diameter portions of the through bore of said flange are connected through the slanted portion.

* * * * *